United States Patent

Beggs

[11] 3,844,764
[45] Oct. 29, 1974

[54] PROCESS FOR THE CONTINUOUS PASSIVATION OF SPONGE IRON PARTICLES

[75] Inventor: Donald Beggs, Toledo, Ohio
[73] Assignee: Medrex Corporation, Toledo, Ohio
[22] Filed: Dec. 26, 1973
[21] Appl. No.: 428,147

[52] U.S. Cl. ............... 75/.5 R, 75/.5 AA, 75/.5 BA
[51] Int. Cl. ........................... C23f 7/04, C21b 1/00
[58] Field of Search ............. 75/.5 BA, .5 AA, .5 R; 148/126, 6.35

[56] References Cited
UNITED STATES PATENTS

| | | | |
|---|---|---|---|
| 2,677,669 | 5/1959 | Ahlberg | 252/470 X |
| 2,766,108 | 10/1956 | Eberhardt | 75/.5 BA |
| 3,147,106 | 9/1964 | Johnson | 75/.5 BA |
| 3,615,340 | 10/1971 | Fuqua | 75/.5 BA |
| 3,617,394 | 11/1971 | Mayer | 75/.5 BA X |

*Primary Examiner*—L. Dewayne Rutledge
*Assistant Examiner*—Arthur J. Steiner
*Attorney, Agent, or Firm*—Morgan, Finnegan, Durham & Pine

[57] ABSTRACT

A process is provided for the passivation of sponge iron particles which are continuously fed into a vessel and continuously withdrawn therefrom. The particles descend downwardly through the vessel and are passivated by a continuous stream of a gaseous medium flowing countercurrently therethrough. The stream is precisely regulated in its oxygen composition, flow rate and temperature.

3 Claims, 1 Drawing Figure

PATENTED OCT 29 1974 3,844,764
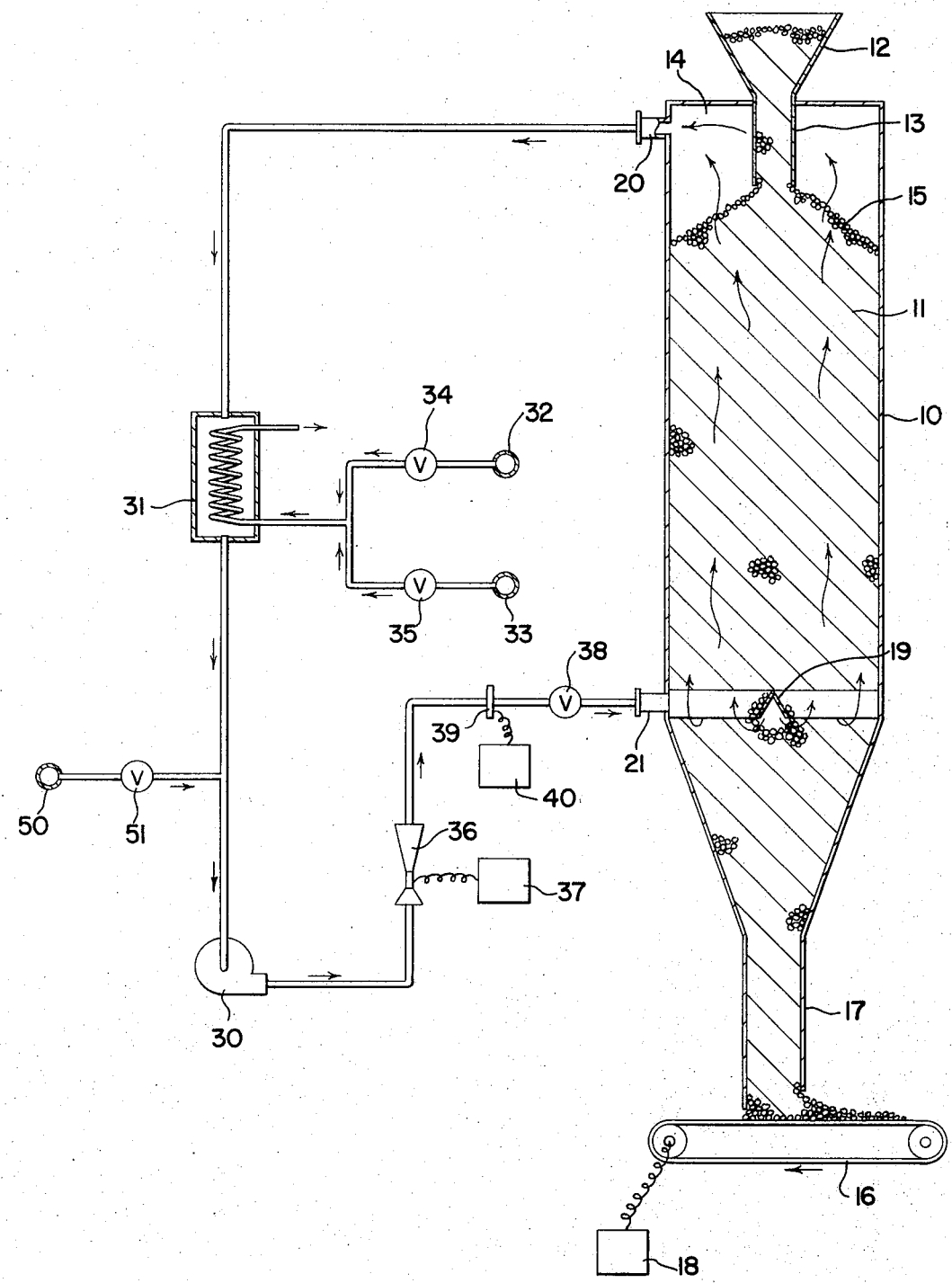

PROCESS FOR THE CONTINUOUS PASSIVATION OF SPONGE IRON PARTICLES

This invention relates generally to a process for passivation of directly reduced metallic or sponge iron particles and more particularly to a continuous process therefor.

In recent years there has been a great deal of activity in the production of iron particles, pellets, briquets, and the like (and fines associated therewith) from the direct reduction of iron oxide pellets or natural ores, which hereinafter will be collectively referred to as sponge iron particles. Utilizing sponge iron particles allows one to produce steel by feeding such pellets directly to an electric arc furnace without the high capital investment required in large steel plants.

One of the problems associated with the use of sponge iron particles is their inherent nature to reoxidize upon exposure to ambient conditions. Such reoxidation causes problems relative to the shipment of these particles, whether by barge, railway, trucks or the like. There have been many attempts to overcome, or diminish, the reoxidation of sponge iron particles through the use of organic and inorganic coatings, and by reducing the exposed surface area. Most of these attempts have been relatively unsuccessful as they fail to substantially passivate the particles and/or the resulting process is too expensive. Additionally, most of the investigators have worked with small quantities of materials which do not exhibit characteristics of sponge iron particles when stored in bulk quantities.

More recently, sponge iron particles have been successfully passivated in batch type sequences by introducing a gas containing oxygen into a bed of such particles contained within a batch type holding tank. An example of such a process is disclosed in a copending application having Ser. No. 334,228, filed on Feb. 21, 1973 and assigned to the assignee. Such processes must necessarily employ at least two relatively large holding tanks, one of which is onstream while the other is being emptied of its passivated sponge iron particles.

It is thus an object of the subject invention to provide a process whereby sponge iron particles may be passivated in a continuous manner.

It is yet another object of the subject invention to provide a process for continuously passivating sponge iron particles by a constantly circulating gaseous mixture.

Yet another object of the subject invention is to provide, in a continuous process for passivating sponge iron particles, a gaseous mixture which has a controlled oxygen content.

Still another object of the subject invention is to provide a process for passivating sponge iron particles which uses a gaseous mixture at controlled temperature and flow to passivate said particles.

These objects along with other features of the subject invention are achieved in a process for passivating active sponge iron particles by maintaining a continuously gravitationally descending column of sponge iron particles within a vertically oriented housing or vessel. A gaseous medium is continuously recirculated through the descending column in counterflow relationship to the descending particles. The gaseous medium is maintained at a predetermined temperature at its introduction to the column of descending particles. Additionally oxygen is added to gaseous medium at a predetermined rate and the flow of the gaseous medium in the column is likewise maintained at a predetermined rate.

The invention may take physical form in certain parts and arrangement of parts, a preferred embodiment of which will be described in detail herein and illustrated in the accompanying drawing which forms a part hereof and wherein:

FIG. 1 is a diagrammatic representation of apparatus for carrying out the passivation process of the subject invention.

Referring now to the drawing wherein the showing is offered for the purpose of illustrating a preferred embodiment of the invention only and not for the purpose of limiting same, there is shown in FIG. 1 an enclosed vessel or housing 10 for containing a gravitationally descending bed of sponge iron particles 11. A feed hopper 12 for receiving active sponge iron particles connects to a feed pipe 13 for feeding particles into vessel 10. Feed pipe 13 extends below the top of the vessel to create a gas exit chamber 14 between the top of the vessel and an angle of repose of the particles indicated at 15. A belt feeder or other type discharge feeder 16 serves to withdraw passivated sponge iron particles from vessel 10 through a discharge pipe 17. The feeder 16 connects to a particle discharge rate measuring device 18 such as would be conventional for a belt type weigh scale. A gas introduction member 19, shown as an inverted V cross, serves to provide means for introducing gas into the bed of particles in the lower region of vessel 10. A gas offtake 20 connects to gas exit chamber 14 and a gas intake 21 connects to gas introduction member 19. A recirculating fan 30 serves to recirculate gas from gas offtake 20 to gas intake 21 to cause generally upward gas flow in vessel 10 in countercurrent relationship to the gravitational descent of the sponge iron particles.

The gas recirculation system shown includes an indirect heat exchanger 31 for heating or cooling gas withdrawn from offtake 20. This heat exchanger can, for example, be a conventional fin tube type supplied either with a heating medium such as steam from a source 32 or a cooling medium such as water from a source 33, with associated control valves 34 and 35. A recirculating gas flow metering device 36 such as a venturi meter is provided with a flow measuring device 37. A recirculating gas flow control valve 38 serves to control the gas flow in a manner hereinafter described. A gas temperature sensor 39 such as a thermocouple is connected to a temperature controller 40 which serves to control the action of valves 34 or 35 depending on whether the recirculating gas needs to be heated or cooled in heat exchanger 31, in order to maintain a desired gas temperature at sensor 39. An oxygen containing gas such as air is admitted to the recirculating gas stream from a source 50 through a control valve 51 in a controlled manner to be hereinafter described.

Sponge iron particles in the form of reduced pellets or lump made from oxide pellets or lump ore, as produced and when initially exposed to air will oxidize at different rates depending upon the physical and chemical properties of the oxide material, such as its porosity and gangue content. In many tests in the laboratory and in the field on a commercial scale, it has been discovered that active sponge iron particles can be effectively passivated with minimum oxidation by exposure to a gas containing oxygen for a one to two day period under controlled oxygen and temperature conditions. During such exposure, a very thin skin of magnetite is formed on the sponge iron surface throughout the interior of the particles which inhibits further oxidation. During the exposure, the particles progressively passivate and consume oxygen at a declining rate which approaches zero after one to two days.

It has been found that effective passivation can be accomplished by maintaining the particles at a temperature in the range of 125°F. to 175°F. during the exposure period. At 100°F., exposure to oxygen does not effectively passivate in a two day period. At 200°F. and higher, the passivation is effective but there is a tendency to oxidize more of the iron than is desired in order to achieve effective passivation.

During exposure in the above preferred temperature range of 125°F. to 175°F., the oxygen consumption necessary to achieve effective passivation is in the range of 0.004 to 0.01 cubic feet of oxygen per pound of sponge iron particles. This is equivalent to oxidation of from about 0.1 percent to 0.25 percent of the iron in the particles.

During the exposure period it has been found that oxygen concentrations in the range of 500 parts per million to 20,000 parts per million are effective in achieving passivation. However, the oxidation reaction is exothermic and oxygen concentrations in the range of 500 to 2,000 parts per million are preferred in order to limit the initial reaction rate and resultant temperature rise.

In order to establish and maintain the temperature of the particles in the preferred range in the subject invention without dependence upon incoming particle temperature, it is necessary that not only the temperature of the incoming gas be controlled within the range but also the thermal capacity of the gas must be at least equal to the thermal capacity of the particles. With an equal thermal capacity, a 1°F. change in gas temperature is the same amount of heat as 1°F. change in particle temperature. The specific heat of sponge iron is approximately 0.12 Btu per pound per degree F. and the specific heat of all gases is approximately 0.0185 Btu per cubic foot per degree F., in a temperature range of 125°F. to 175°F. Thus, approximately 0.12 divided by 0.0185, or 6.5 cubic feet of gas will have the same thermal capacity as one pound of sponge iron.

Referring to FIG. 1, the preferred method of operation will now be described.

The temperature of the recirculated gas being introduced to the bed of particles through member 19 is controlled by the action of temperature control 40 acting upon heating control valve 34 or cooling control valve 35 in a conventional manner to maintain the temperature of introduction in the preferred range of 125°F. to 175°F.

The admission of oxygen to the recirculated gas from source 50 is controlled by the action of particle discharge rate measuring device 18 acting upon control valve 51 in a conventional manner to admit between 0.004 and 0.01 cubic feet of oxygen per pound of particles being discharged by discharge feeder 16. Alternatively, control valve 51 can be acted upon by an oxygen analyzer-controller (not shown) to maintain the oxygen level in the range of 500 to 2,000 parts per million in the recirculated gas. The fan 30, in addition to providing the means for gas recirculation also serves to mix the freshly admitted oxygen with the recirculated gas.

The flow rate of the recirculating gas is controlled by the action of particle discharge measuring device 18 acting upon flow measuring device 37 which in turn acts upon flow control valve 38 in a conventional manner to maintain a flow of at least 6.5 cubic feet of recirculated gas per pound of particles being discharged by discharge feeder 16.

As a part of the research work carried out in conjunction with the subject invention, a sponge iron activity test procedure was developed to check the activity when exposed to air. This test procedure consists of filling a one quart container with sponge iron particles, then putting on a tight lid having an inlet and an outlet valve, purging with nitrogen and then closing both valves. The container is weighed and then brought to a controlled temperature of 100°F. in an oven and allowed to equalize for a few hours to insure that all of the particles are at 100°F. The container is then purged with air, one of the lid valves is then closed and a manometer pressure indicating gauge is connected to the other valve which is left open. As oxygen from the air in the container is consumed, the pressure in the container declines. From the rate of decline of the pressure, the rate of oxygen consumption is calculated, and the activity of the sponge iron is expressed in terms of cubic feet of oxygen consumed per hour per ton of sponge iron particles.

As a typical example of the effectiveness of the passivation process of the present invention, fresh active sponge iron particles exposed to 500 parts per million of oxygen in nitrogen for 1, 2 and 3 days at 125°F. had the following activities:

| Fresh | 8.8 |
| 1 Day | 0.15 |
| 2 Days | 0.037 |
| 3 Days | 0.031 |

The invention has been described with reference to a preferred embodiment. Obviously modifications and alterations will occur to others upon reading and understanding the disclosure set forth herein. It is my intention to include all such modifications and alterations insofar as they come within the scope of the subject invention.

It is thus the essence of the subject invention to provide a process for the continuous passivation of sponge iron particles by the use of a precisely controlled gaseous medium.

Having thus described my invention, I claim:

1. A process for passivating active sponge iron particles comprising:
   maintaining a continuously gravitationally descending column of sponge iron particles within a vertically oriented housing;
   continuously recirculating a gaseous medium through the descending column in counterflow relationship to the descending particles;
   maintaining a predetermined temperature of introduction of the gaseous medium to the column of at least 125°F to thereby heat said particles to said temperature;
   adding oxygen to the gaseous medium at a predetermined rate of at least 0.004 standard cubic feet of oxygen per pound of sponge iron being passivated; and maintaining a predetermined flow rate of the recirculating gaseous medium in the column.

2. In claim 1, the rate of oxygen addition being sufficient to maintain an oxygen concentration in the range of 500 to 2,000 parts per million in the gaseous medium being introduced to the column.

3. In claim 1, the predetermined flow rate of the recirculating gaseous medium in the column being a minimum of about 6.5 standard cubic feet per pound of sponge iron being passivated.

* * * * *